(12) United States Patent
Onishi et al.

(10) Patent No.: US 11,466,743 B2
(45) Date of Patent: Oct. 11, 2022

(54) BRACKET FOR ANTI-VIBRATION DEVICE AND METHOD FOR MANUFACTURING BRACKET FOR ANTI-VIBRATION DEVICE

(71) Applicant: Prospira Corporation, Kawasaki (JP)

(72) Inventors: Tadashi Onishi, Tokyo (JP); Yukiko Abe, Tokyo (JP); Kenichirou Iwasaki, Tokyo (JP); Masato Kobayashi, Tokyo (JP); Kei Yasui, Tokyo (JP)

(73) Assignee: Prospira Corporation, Kawasaki (JP)

( * ) Notice: Subject to any disclaimer, the term of this patent is extended or adjusted under 35 U.S.C. 154(b) by 124 days.

(21) Appl. No.: 16/652,677

(22) PCT Filed: Oct. 25, 2018

(86) PCT No.: PCT/JP2018/039774
§ 371 (c)(1),
(2) Date: Apr. 1, 2020

(87) PCT Pub. No.: WO2019/082994
PCT Pub. Date: May 2, 2019

(65) Prior Publication Data
US 2020/0300326 A1    Sep. 24, 2020

(30) Foreign Application Priority Data

Oct. 26, 2017 (JP) .............................. JP2017-207509

(51) Int. Cl.
*F16F 1/36* (2006.01)
*F16F 15/08* (2006.01)
(Continued)

(52) U.S. Cl.
CPC ................ *F16F 1/36* (2013.01); *B29C 45/14* (2013.01); *F16F 7/00* (2013.01); *F16F 15/08* (2013.01);
(Continued)

(58) Field of Classification Search
CPC .. F16F 15/08; F16F 1/36; F16F 1/3849; F16F 2224/0241; F16F 2226/00; F16F 7/00;
(Continued)

(56) References Cited

U.S. PATENT DOCUMENTS 10,066,698 B2     9/2018   Kaneko et al.
2007/0178258 A1*  8/2007   Petit ........................ F16F 13/10
                                                          428/34.1

FOREIGN PATENT DOCUMENTS

CN    101012862 A    8/2007
CN    201149063 Y    11/2008
(Continued)

OTHER PUBLICATIONS

Jan. 22, 2019, International Search Report issued in the International Patent Application No. PCT/JP2018/039774.
(Continued)

*Primary Examiner* — Yan Lan
(74) *Attorney, Agent, or Firm* — Kenja IP Law PC

(57) ABSTRACT

Provided are a bracket for an anti-vibration device, and a method for manufacturing the same, in which increase of weight and peeling of a reinforcing portion are suppressed. A bracket (1) has: a reinforcing portion (20) extending in a surrounding direction of the surrounding portion (10), having ends (21) in both directions of the surrounding direction, and being fixed to an outer surface of the portion (10); and ribs (30) formed on an outer circumference of the portion (10) so as to span the ends (21) of the reinforcing portion (20) in the surrounding direction of the portion (10). The portion (10) and the ribs (30) are made of synthetic resin. A method for manufacturing the bracket (1) includes a step of injecting synthetic resin serving as the portion (10) and the ribs (30) into a mold cavity where a reinforcing member serving as the portion (20) is set.

8 Claims, 3 Drawing Sheets

(51) Int. Cl.
  *B29C 45/14* (2006.01)
  *F16F 7/00* (2006.01)
(52) U.S. Cl.
  CPC ......... *F16F 2226/00* (2013.01); *Y10T 428/13* (2015.01)
(58) Field of Classification Search
  CPC .............. B29C 45/14; B29C 45/14311; B29C 45/14631; Y10T 428/13
  See application file for complete search history.

(56) References Cited

FOREIGN PATENT DOCUMENTS

| CN | 105934605 A | 9/2016 |
|---|---|---|
| CN | 107131249 A | 9/2017 |
| JP | 2003074635 A | 3/2003 |
| JP | 2013164150 A | 8/2013 |
| JP | 2013167264 A | 8/2013 |
| JP | 2016125522 A | 7/2016 |
| JP | 2017155754 A | 9/2017 |

OTHER PUBLICATIONS

Jul. 28, 2021, search result of the Extended European Search Report issued by the European Patent Office in the corresponding European Patent Application No. 18870899.4.

Mar. 3, 2021, search result of Office Action issued by the China National Intellectual Property Administration in the corresponding Chinese Patent Application No. 201880068070.7.

Apr. 28, 2020, International Preliminary Report on Patentability issued in the International Patent Application No. PCT/JP2018/039774.

* cited by examiner

BRACKET FOR ANTI-VIBRATION DEVICE AND METHOD FOR MANUFACTURING BRACKET FOR ANTI-VIBRATION DEVICE

TECHNICAL FIELD

The present disclosure relates to a bracket for an anti-vibration device, and a method for manufacturing a bracket for an anti-vibration device.

BACKGROUND

As a conventional bracket for an anti-vibration device, a bracket obtained by bonding a reinforcing member (reinforcing portion) composed of glass fiber fabric to a synthetic resin material (surrounding portion) as a main component of the bracket is used (for example, refer to PTL 1). According to such a bracket for an anti-vibration device, it is possible to exert high strength and exert high fatigue resistance under sufficient weight reduction of the bracket.

CITATION LIST

Patent Literature

PTL 1: Japanese Patent Laid-Open No. 2013-167264

SUMMARY

Technical Problem

However, as such a reinforcing member, there is a reinforcing member having heavier specific gravity than a synthetic resin material like pregreg. In a case where such a reinforcing member is used, the whole weight of a bracket is increased compared to a bracket composed of only synthetic resin. Therefore, it is conceivable that the reinforcing member is used only in a necessary portion with intention of reduction of the weight of the bracket. However, when the reinforcing member is used only in the necessary portion, and receives a load, it is concerned that an end of the reinforcing member is peeled from the surrounding portion.

An object of the present disclosure is to provide a bracket for an anti-vibration device, and a method for manufacturing a bracket for an anti-vibration device, in which increase of weight and peeling of a reinforcing portion are suppressed.

Solution to Problem

A bracket for an anti-vibration device according to the present disclosure is a bracket for an anti-vibration device having a surrounding portion for surrounding an anti-vibration member and a mounting member configured to be mounted on one of a vibration generation side and a vibration receiving side, the bracket for an anti-vibration device configured to be mounted on another of the vibration generation side and the vibration receiving side, the bracket for an anti-vibration device having: a reinforcing portion that extends in a surrounding direction of the surrounding portion, has ends in both directions of the surrounding direction, and is fixed to a side of an outer surface of the surrounding portion; and a rib that is formed on the outer surface of the surrounding portion so as to span the end of the reinforcing portion in the surrounding direction of the surrounding portion, wherein the surrounding portion and the rib are made of synthetic resin. According to the bracket for an anti-vibration device of the present disclosure, increase of weight and peeling of the reinforcing portion is suppressed.

In the bracket for an anti-vibration device according to the present disclosure, the surrounding portion can have: a first surrounding portion that is fixed to the other of the vibration generation side and the vibration receiving side: and a second surrounding portion that surrounds the anti-vibration member and the mounting member together with the first surrounding portion, the reinforcing portion can be fixed to an outer surface of the second surrounding portion, and the rib can be formed on the first surrounding portion and the second surrounding portion. In this case, it is possible to intensively reinforce a portion where stress is likely to be generated, while suppressing peeling of the reinforcing portion.

In the bracket for an anti-vibration device according to the present disclosure, the first surrounding portion can have a protruding portion that protrudes outward with respect to the second surrounding portion, and the rib can be formed on an outer surface of the protruding portion of the first surrounding portion, and the outer surface of the second surrounding portion. In this case, it is possible to enhance the strength and the rigidity of the bracket for an anti-vibration device.

The bracket for an anti-vibration device according to the present disclosure preferably has the reinforcing portion, and the surrounding portion and the rib molded integrally with the reinforcing portion. In this case, it is possible to more reliably suppress peeling of the reinforcing portion.

A method for manufacturing a bracket for an anti-vibration device according to the present disclosure is a method for manufacturing a bracket for an anti-vibration device, for obtaining the aforementioned bracket for an anti-vibration device, including a step of injecting synthetic resin serving as the surrounding portion and the rib into a mold cavity where a reinforcing member serving as the reinforcing portion is set. In this case, it is possible to easily obtain the bracket in which increase of weight and peeling of the reinforcing portion are suppressed.

Advantageous Effect

According to the present disclosure, it is possible to provide a bracket for an anti-vibration device, and a method for manufacturing a bracket for an anti-vibration device, in which increase of weight and peeling of a reinforcing portion are suppressed.

DETAILED DESCRIPTION

Hereinafter, a bracket for an anti-vibration device and a method for manufacturing a bracket for an anti-vibration device according to each of various embodiments of the present disclosure will be described with reference to the drawings.

Figure 1:
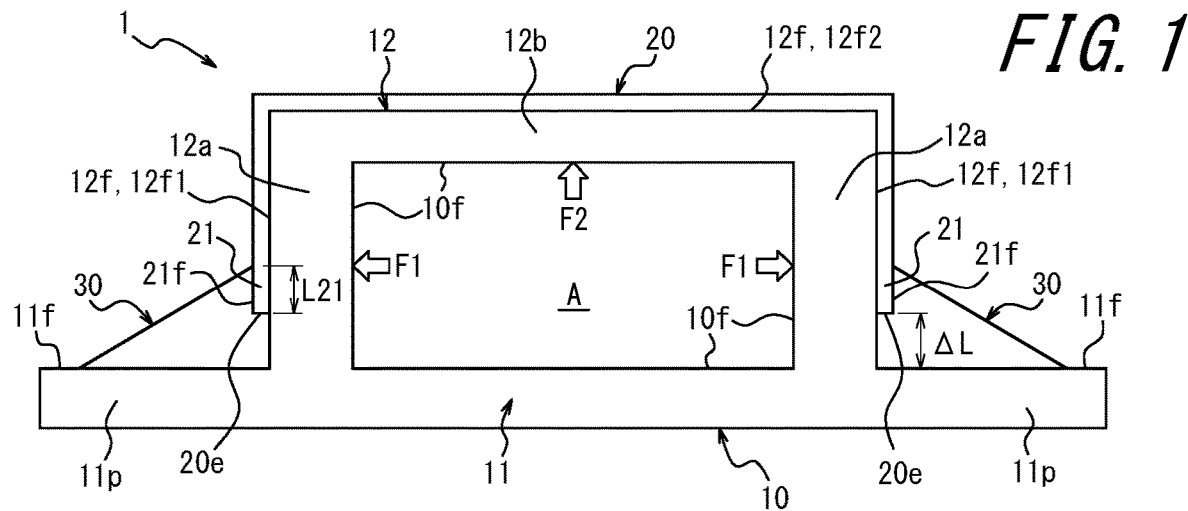
FIG. 1 is a front view of a bracket for an anti-vibration device according to a first embodiment of the present disclosure.
Figure 2:
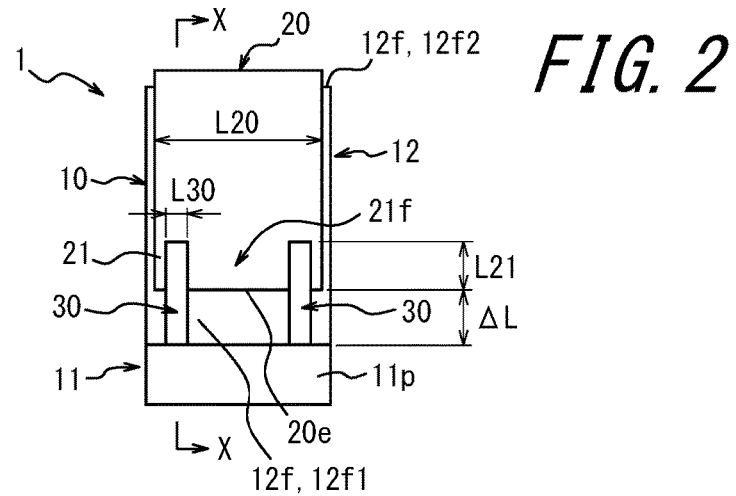
FIG. 2 is a side view of the bracket for an anti-vibration device of FIG. 1.
Figure 3:
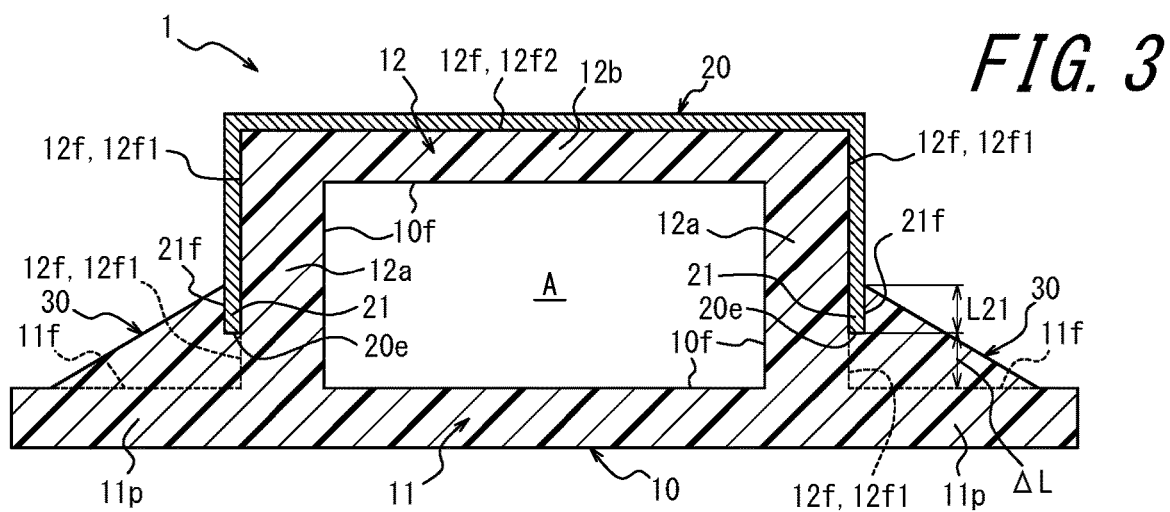
FIG. 3 is an X-X sectional view of FIG. 2.

In FIG. 1 to FIG. 3, reference numeral 1 denotes the bracket for an anti-vibration device according to a first embodiment of the present disclosure.

As illustrated in FIG. 1 and other drawings, a bracket for an anti-vibration device 1 (hereinafter also simply referred to as a "bracket 1") has a surrounding portion 10 that surrounds an anti-vibration member (not illustrated) and a mounting member (not illustrated). The mounting member is mounted on one of a vibration generation side and a vibration receiving side. On the other hand, the bracket 1 is mounted on the other of the vibration generation side and the vibration receiving side.

More specifically, the bracket 1 according to this embodiment is a bracket mounted on a vehicle as a part of the anti-vibration device. In this embodiment, for example, the vibration generation side can be an engine side, and the vibration receiving side can be a vehicle body side. According to this embodiment, the vibration generation side can be the vehicle body side, and the vibration receiving side can be the engine side.

Examples of the anti-vibration member include an elastic member such as rubber. According to the bracket 1 of this embodiment, the anti-vibration member can be mounted on the mounting member and the bracket 1. As a specific example, the anti-vibration member can be fixed (bonded) to the mounting member by an adhesion method by an adhesive, an adhesion method by vulcanization, or the like. The anti-vibration member can be fixed (bonded) to the bracket 1 by a similar method. That is, when the bracket 1 according to this embodiment is used, the vibration generation side and the vibration receiving side can be elastically supported through the anti-vibration member.

Specifically, as illustrated in FIG. 1 and other drawings, in the bracket 1 according to this embodiment, the surrounding portion 10 forms a through-hole A inside the surrounding portion 10. The anti-vibration member and the mounting member can be housed in the through-hole A of the surrounding portion 10. The anti-vibration member can be fixed to the mounting member. Additionally, the anti-vibration member can be fixed to an inner circumferential surface 10$f$ of the surrounding portion 10 that shapes the through-hole A.

In the bracket 1 according to this embodiment, the extending direction of the through-hole A (the direction of the front and rear sides of paper of FIGS. 1 and 3, or the right-left direction of FIG. 2) is defined as the lengthwise direction of the bracket 1. In this embodiment, the up-down direction of the bracket 1 (the up-down direction of the drawings) in the direction orthogonal to the lengthwise direction of the bracket 1 is defined as the height direction of the bracket 1. Furthermore, in this embodiment, the direction orthogonal to the height direction of the bracket 1 in the direction orthogonal to the lengthwise direction of the bracket 1 (the right-left direction of FIGS. 1 and 3, or the direction of the front and rear sides of paper of FIG. 2) is defined as the width direction of the bracket 1.

In the bracket 1 according to this embodiment, as illustrated in FIG. 1 and other drawings, the surrounding portion 10 has a first surrounding portion 11, and a second surrounding portion 12. The first surrounding portion 11 can be fixed to the other side of the vibration generation side and the vibration receiving side. In this embodiment, the first surrounding portion 11 is a planar plate-like portion, as illustrated in FIG. 1, FIG. 2 and other drawings. The second surrounding portion 12 can surround the anti-vibration member and the mounting member together with the first surrounding portion 11. In this embodiment, the second surrounding portion 12 is an arch-shaped portion, as illustrated in FIG. 1 and other drawings. Consequently, in this embodiment, the through-hole A is shaped by the first surrounding portion 11 and the second surrounding portion 12. Furthermore, in this embodiment, as illustrated in FIG. 2, more specifically, a front surface and a back surface of the surrounding portion 10 are composed of planar surfaces, like surfaces located on tip sides of arrows of lead lines of reference numerals 10 and 11 and reference numeral 12 of FIG. 2. However, according to the present disclosure, the front surface and the back surface of the surrounding portion 10 can be composed of surfaces having ribs, projections, unevenness, and the like.

In the bracket 1 according to this embodiment, the first surrounding portion 11 has protruding portions 11$p$ that protrude outward with respect to the second surrounding portion 12. In this embodiment, as illustrated in FIG. 1 and other drawings, the protruding portions 11$p$ protrude outward with respect to the second surrounding portion 12 in the width direction of the bracket 1.

Reference numeral 20 is a reinforcing portion extending in the surrounding direction of the surrounding portion 10, having ends 21 in the both directions of the surrounding direction, and fixed to an outer circumferential surface of the surrounding portion 10. In this embodiment, the reinforcing portion 20 is a compound material having strength improved by containing synthetic resin in fibrous elements, a so-called fiber reinforced plastic (FRP). Examples of the fiber reinforced plastic include prepreg. Examples of the fibrous elements include glass fiber fabric, carbon fiber fabric, metal fiber fabric, organic fiber, and fiber fabric having higher bending strength than synthetic resin, described below, composing the surrounding portion 10 and ribs 30. Preferably, glass fiber fabric is used as the fibrous elements. Examples of the synthetic resin include thermoplastic synthetic resin, and thermosetting synthetic resin. Preferably, thermoplastic synthetic resin is used as the synthetic resin. Examples of such thermoplastic synthetic resin include 6-6 nylon, 6 nylon, and polypropylene. Examples of the fiber reinforced plastic include a UD (Uni Direction) material obtained by containing synthetic resin in fibrous elements having directionality. Examples of the fibrous elements include glass fiber, carbon fiber, metal fiber, organic fiber, fiber having higher bending strength than the synthetic resin, described below, composing the surrounding portion 10 and the ribs 30, and fibers other than these fibers. In the bracket 1 according to this embodiment, for example, the fibrous elements are arrayed in such a direction as to be oriented to the surrounding direction.

Examples of the reinforcing portion 20 include a member manufactured by using reinforcing members containing fiber fabric on both surfaces of the aforementioned fiber fabric, the reinforcing members being obtained by laminating the aforementioned synthetic resin in a sheet form or a film form. Specifically, the reinforcing portion 20 is a member obtained by cutting the reinforcing member into predetermined size, and forming the obtained reinforcing member in a form suitable for the bracket 1 by heat press molding, for example.

In the bracket 1 according to this embodiment, the reinforcing portion 20 is fixed to an outer surface 12$f$ of the second surrounding portion 12 in the outer circumferential surface of the surrounding portion 10. In this embodiment, the second surrounding portion 12 includes two column portions 12*a* connected to the first surrounding portion 11, and disposed at an interval in the width direction of the bracket 1, and a beam portion 12*b* connecting upper ends of the two column portions 12*a*. In this embodiment, the outer surface 12*f* of the second surrounding portion 12 includes outer surfaces 12*f*1 of the two column portions 12*a* and an outer surface 12*f*2 of the beam portion 12*b*. In this embodiment, the reinforcing portion 20 extends in the surrounding direction from the outer surface 12*f*1 of one of the column portions 12*a* to the outer surface 12*f*1 of the other column portion 12*a* through the outer surface 12*f*2 of the beam portion 12*b*. Two edges 20*e* of the reinforcing portion 20 can extend up to positions of outer surfaces (upper surfaces) 11*f* of the protruding portions 11*p* of the first surrounding portion 11 in the height direction of the bracket 1. In this embodiment, as illustrated in FIG. 1 and other drawings, each of the two edges 20*e* of the reinforcing portion 20 is located above the outer surface 11*f* of the protruding portion 11*p* of the first surrounding portion 11 by a length ΔL. The length ΔL can be suitably set in accordance with the materials of the surrounding portion 10 and the reinforcing portion 20, a bonding area of the reinforcing portion 20 to the outer circumferential surface of the surrounding portion 10 (outer surfaces 11*f* of the protruding portions 11*p* of the first surrounding portion 11 and the outer surfaces 12*f*1 of the column portions 12*a* of the second surrounding portion 12 in this embodiment), or the like.

Reference numeral 30 denotes a rib formed on an outer surface of the surrounding portion 10 so as to span the end 21 of the reinforcing portion 20 in the surrounding direction of the surrounding portion 10. As illustrated in FIG. 1 and other drawings, in the bracket 1 according to this embodiment, the outer surface of the surrounding portion 10 includes the outer surface 11*f* of the first surrounding portion 11 and the outer surface 12*f* of the second surrounding portion 12. In this embodiment, the two ribs 30 are disposed on both sides in the width direction of the bracket 1. However, according to the present disclosure, the rib 30 can be disposed at least one of the sides in the width direction of the bracket 1. In this embodiment, as illustrated in FIG. 1 and other drawings, the ribs 30 are plate-like ribs extending in the width direction and the height direction of the bracket 1. In this embodiment, the ribs 30 are shaped in a triangle viewed in the lengthwise direction of the bracket 1, as illustrated in FIG. 1 and other drawings. In this embodiment, as illustrated in FIG. 2, the ribs 30 are disposed at two portions at an interval in the lengthwise direction of the bracket 1. As illustrated in FIG. 2, in each rib 30, the length (thickness) L30 of the rib 30 in the lengthwise direction of the bracket 1 is shorter than the length L20 of the reinforcing portion 20 in the lengthwise direction of the bracket 1.

The rib 30 can be disposed in at least one portion in the lengthwise direction of the bracket 1 on either side in the width direction of the bracket 1. That is, according to the present disclosure, at least the one rib 30 can be provided in at least one side in the width direction of the bracket 1. For example, the rib 30 further extends in the lengthwise direction of the bracket 1, so that the one rib 30 can cover at least a part or all in the width direction of an outer surface 21*f* of the end 21 of the reinforcing portion 20, and press the end 21 on each of the both sides of the width direction of the bracket 1, or on at least one side in the width direction of the bracket 1. However, like this embodiment, when the ribs 30 can be locally disposed in the lengthwise direction of the bracket 1, it is possible to reduce the weight of the bracket 1.

Each rib 30 is made of synthetic resin together with the surrounding portion 10. In the present disclosure, the rib 30 formed on the outer surface of the surrounding portion 10 includes forming the ribs 30 separately from the surrounding portion 10, and fixing the ribs to the surrounding portion 10 by means such as adhesion. On the other hand, as illustrated in FIG. 3, in the bracket 1 according to this embodiment, the surrounding portion 10 and the ribs 30 are molded integrally with the reinforcing portion 20 by injection molding. That is, in this embodiment, the ribs 30 are formed integrally with the surrounding portion 10, so that the ribs 30 are formed on the surrounding portion 10. Specifically, in this embodiment, the ribs 30 are formed on the first surrounding portion 11 and the second surrounding portion 12. Specifically, in this embodiment, the ribs 30 are formed on the outer surface (upper surface) 11*f* of the protruding portions 11*p* of the first surrounding portion 11, and the outer surface 12*f* of the second surrounding portion 12. In this embodiment, the outer surface 12*f* of the second surrounding portion 12, the outer surface 12*f* being formed with the ribs 30, are the outer surfaces 12*f*1 of the column portions 12*a* except the reinforcing portion 20.

Examples of the synthetic resin serving as the ribs 30 together with the surrounding portion 10 include thermoplastic synthetic resin, and thermosetting synthetic resin. Preferably, thermoplastic synthetic resin is used as the synthetic resin. Examples of such thermoplastic synthetic resin include 6-6 nylon, 6 nylon, and polypropylene. The ribs 30 can be made of synthetic resin identical to or different from the surrounding portion 10.

In the bracket 1 according to this embodiment, the ribs 30 are bonded to the outer surfaces 21*f* of the ends 21 of the reinforcing portion 20 by injection molding. Consequently, the ribs 30 are fixed to the outer surfaces 21*f* of the ends 21 of the reinforcing portion 20. That is, the ends 21 of the reinforcing portion 20 are fixed to the surrounding portion 10, and are fixed to the ribs 30. Consequently, the ends 21 of the reinforcing portion 20 are firmly pressed between the surrounding portion 10 and the ribs 30.

In the bracket 1 according to this embodiment, the lengths L21 of the outer surfaces 21*f* of the ends 21 of the reinforcing portion 20 in the height direction of the bracket 1, the outer surfaces 21*f* being covered with the ribs 30 (hereinafter also simply referred to as a "lengths L21 of the ends 21 of the reinforcing portion 20") are predetermined lengths from the edges 20*e* of the reinforcing portion 20. The lengths L21 of the ends 21 of the reinforcing portion 20 can be suitably set in accordance with the materials of the surrounding portion 10 and the reinforcing portion 20, the bonding areas of the reinforcing portion 20 to the outer circumferential surface of the surrounding portion 10 (outer surfaces 11*f* of the protruding portions 11*p* of the first surrounding portion 11 and the outer surfaces 12*f*1 of the column portions 12*a* of the second surrounding portion 12 in this embodiment), the number of the ribs 30, or the like.

As described above, the bracket 1 according to this embodiment has the reinforcing portion 20 and the ribs 30. The reinforcing portion 20 extends in the surrounding direction of the surrounding portion 10, and has the ends 21 in the both directions of the surrounding direction. The ribs 30 are formed on the outer surface of the surrounding portion 10 so as to span the ends 21 of the reinforcing portion 20 in the surrounding direction of the surrounding portion 10. Furthermore, the surrounding portion 10 and the ribs 30 are made of synthetic resin.

As described above, the bracket 1 according to this embodiment is mainly made of synthetic resin. Consequently, the weight of the bracket 1 is reduced compared to a case of a metal bracket, similarly to a conventional case. In the bracket 1 according to this embodiment, the reinforcing portion 20 is locally fixed to the outer surface of the surrounding portion 10 only at a desired position (region) necessary for reinforcement. Consequently, even when a reinforcing member having heavier specific gravity than synthetic resin is used as the reinforcing portion 20, it is possible to suppress increase of the weight compared to a bracket made of only synthetic resin. In the bracket 1 according to this embodiment, the ribs 30 formed on the surrounding portion 10 span and cover the outer surfaces 21*f* of the ends 21 of the reinforcing portion 20, so that the ends 21 are pressed between the surrounding portion 10 and the ribs 30. Consequently, even when the reinforcing portion 20 locally fixed to the outer surface of the surrounding portion 10 receives a load from the inside (through-hole A) of the surrounding portion 10, it is possible to suppress peeling of the ends 21 of the reinforcing portion 20. Therefore, according to the bracket 1 of this embodiment, increase of weight and peeling of the reinforcing portion 20 is suppressed.

According to the bracket 1 of this embodiment, the reinforcing portion 20 can be fixed to the outer surface side of the surrounding portion 10. Herein, the outer surface side of the surrounding portion 10 means a region from the center in the width direction of the width of the surrounding portion 10 to the outer surface of the surrounding portion 10. In other words, the outer surface side of the surrounding portion 10 means a region from the outer surface of the surrounding portion 10 to the position of ½ of the width of the surrounding portion 10. In this embodiment, the width of the surrounding portion 10 means the thickness of the first surrounding portion 11 and the second surrounding portion 12. Specifically, the thickness of the first surrounding portion 11 means the thickness of the first surrounding portion 11 in the height direction of the bracket 1. The thickness of the second surrounding portion 12 means the thickness of the column portions 12*a* in the width direction of the bracket 1, or the thickness of the beam portion 12*b* in the height direction of the bracket 1. In the bracket 1 according to this embodiment, the reinforcing portion 20 is fixed to the outer surface of the surrounding portion 10. In a case of a bracket having the surrounding portion 10 like the bracket 1, as described below, the surrounding portion 10 tends to mainly receive large load from the inner circumferential surface 10*f* of the surrounding portion 10. On the other hand, in a case where the reinforcing portion 20 is interposed inside the surrounding portion 10, one part of the surrounding portion 10 is disposed at a position outside the reinforcing portion 20, and the reinforcing portion 20 hardly functions to reinforce the one part of the surrounding portion 10. On the other hand, like this embodiment, when the reinforcing portion 20 is fixed to the outer surface side of the surrounding portion 10, the one part of the surrounding portion 10 is hardly disposed outside the reinforcing portion 20, and almost the whole of the surrounding portion 10 is disposed inside the reinforcing portion 20. Consequently, according to this embodiment, it is possible to enhance the strength and the rigidity of the surrounding portion 10 to the load from the inside of the surrounding portion 10. Particularly, like this embodiment, when the reinforcing portion 20 is fixed to the outer surface of the surrounding portion 10, the one part of the surrounding portion 10 is not disposed outside the reinforcing portion 20, and the whole of the surrounding portion 10 is disposed inside the reinforcing portion 20. Consequently, according to this embodiment, it is possible to maximize the strength and the rigidity of the surrounding portion 10 to the load from the inside of the surrounding portion 10.

As described above, in the bracket 1 according to this embodiment, the surrounding portion 10 has the first surrounding portion 11 and the second surrounding portion 12. The reinforcing portion 20 is fixed to the outer surface 12*f* of the second surrounding portion 12. The ribs 30 are fixed to the first surrounding portion 11 and the second surrounding portion 12. In this case, it is possible to intensively reinforce a portion where stress is likely to be generated, while suppressing increase of weight and peeling of the reinforcing portion 20.

Specifically, in a case of the configuration of the bracket 1 according to this embodiment, as illustrated in FIG. 1, large outward loads F1 are likely to be applied to inner surfaces of the column portions 12*a* of the second surrounding portion 12 (inner circumferential surface 10*f* in the width direction of the bracket 1 in the inner circumferential surface 10*f* of the surrounding portion 10). Therefore, high stress tends to be generated in the column portions 12*a* of the second surrounding portion 12. In a case of the configuration of the bracket 1 according to this embodiment, as illustrated in FIG. 1, a large outward load F2 is likely to be applied also to an inner surface of the beam portion 12*b* of the second surrounding portion 12 (inner circumferential surface 10*f* on the upper side in the height direction of the bracket 1 in the inner circumferential surface 10*f* of the surrounding portion 10). Therefore, high stress tends to be generated also in the beam portion 12*b* of the second surrounding portion 12.

On the other hand, in the bracket 1 according to this embodiment, the reinforcing portion 20 is fixed to the outer surface 12*f* of the second surrounding portion 12 so as to correspond to the aforementioned stress distribution. In this embodiment, the ribs 30 are fixed to the first surrounding portion 11 and the second surrounding portion 12 so as to be firmly fixed to the surrounding portion 10. Consequently, in this embodiment, the outer surfaces 12*f*1 of the column portions 12*a* of the second surrounding portion 12 and the outer surface 12*f*2 of the beam portion 12*b* disposed inside the reinforcing portion 20 can be firmly reinforced by the reinforcing portion 20. Therefore, according to this embodiment, it is possible to intensively reinforce a portion where stress is likely to be generated, while suppressing peeling of the reinforcing portion 20.

In the bracket 1 according to this embodiment, as described above, the first surrounding portion 11 has the protruding portions 11*p* that protrude outward with respect to the second surrounding portion 12. The ribs 30 are fixed to the outer surfaces 11*f* of the protruding portions 11*p* of the first surrounding portion 11 and the outer surface 12*f* of the second surrounding portion 12. In this case, the load received by the second surrounding portion 12 (load particularly received in the width direction of the bracket 1 in this embodiment) can be effectively received by the protruding portions 11*p* of the first surrounding portion 11 through the ribs 30. Consequently, according to this embodiment, it is possible to enhance the strength and the rigidity of the bracket 1.

In the bracket 1 according to this embodiment, as described above, the bracket 1 has the reinforcing portion 20, the surrounding portion 10 and the ribs 30 molded integrally with the reinforcing portion 20. In this case, the ribs 30 are formed integrally with the surrounding portion 10, and therefore the strength of the ribs 30 is improved. In this case, the outer surfaces 21*f* of the ends 21 of the reinforcing portion 20 are fixed to the surrounding portion 10 and the ribs 30, so that the outer surfaces 21f are firmly pressed between the surrounding portion 10 and the ribs 30. Consequently, according to this embodiment, it is possible to more reliably suppress peeling of the reinforcing portion 20.

The bracket 1 according to this embodiment can be manufactured by the following method, for example. The method for manufacturing the bracket according to this embodiment includes a step of injecting synthetic resin serving as the surrounding portion 10 and the ribs 30 in a mold cavity where a reinforcing member serving as the reinforcing portion 20 is set.

First, as a first step, the aforementioned reinforcing member serving as the reinforcing portion 20 of the bracket 1 is set as an insert article in the mold cavity (not illustrated) for injection molding. Consequently, the reinforcing member is disposed in a predetermined position (region) in the mold cavity. Next, as a second step, the heated synthetic resin is injected into the mold cavity where the reinforcing member serving as the reinforcing portion 20 is set. When the synthetic resin in the mold cavity is cooled, in the mold cavity, the surrounding portion 10 having the ribs 30 is formed, and the surrounding portion 10 and the reinforcing portion 20 having the ribs 30 are integrally formed. Thus, the bracket 1 according to this embodiment can be formed by performing insert molding using the reinforcing member. Therefore, according to the method for manufacturing the bracket of this embodiment, it is possible to easily obtain the bracket 1 in which increase of weight and peeling of the reinforcing portion are suppressed.

In a case where the reinforcing portion 20 is not disposed at the position (region) of the outer surface of the surrounding portion 10, at the time of the aforementioned insert molding, for example, the synthetic resin is sometimes injected into the mold cavity so as to press a mold surface shaping the outer surface 12f of the second surrounding portion 12. In this case, it is considered that the reinforcing member is deviated from the predetermined position (region) set in the mold cavity, depending on a location position of the reinforcing member with respect to the mold cavity.

On the other hand, in the bracket 1 according to this embodiment, the reinforcing portion 20 is located on the outer surface of the surrounding portion 10. Therefore, when the bracket 1 is manufactured by insert molding of injecting the synthetic resin from the inner circumferential side of the surrounding portion 10, the reinforcing member disposed at the predetermined position in the mold cavity is pressed against the mold surface by the synthetic resin injected into the mold cavity. Consequently, it is possible to suppress the deviation of the reinforcing member at the time of injection molding. That is, when the bracket 1 according to this embodiment is manufactured as a bracket for an anti-vibration device by insert molding, it is possible to obtain the bracket 1 having less deviation of the reinforcing portion 20 to the outer surface of the surrounding portion 10. In other words, according to the bracket 1 of this embodiment, it is possible to easily attain less deviation of the reinforcing portion 20 to the outer surface of the surrounding portion 10 by a simple method.

Now, FIG. 4 and FIG. 5 each illustrate a bracket 2 for an anti-vibration device (hereinafter also simply referred to as a "bracket 2") according to a second embodiment of the present disclosure. In the following description, substantially the same portions as the portions of the bracket 1 according to the first embodiment are denoted by the same reference numeral, and description thereof will be omitted.

In the bracket 2 according to this embodiment, depressions C are provided in an outer surface 12f of a second surrounding portion 12. In this embodiment, ends 21 of a reinforcing portion 20 are fixed to outer surfaces of the depressions C. Outer surfaces 21f of the ends 21 of the reinforcing portion 20 are covered by ribs 30 formed on an outer surface of a surrounding portion 10, similarly to the bracket 1 according to the first embodiment.

In the bracket 2 according to this embodiment, the depressions C are provided in a part of the outer surface 12f of the second surrounding portion 12. As illustrated in FIG. 4 and other drawing, in this embodiment, each of the outer surfaces 12f1 of the column portions 12a of the second surrounding portion 12 is an outer surface having the largest width from an inner circumferential surface 10f of the surrounding portion 10 (hereinafter also referred to as "a maximum width outer surface 12f1 of each column portion 12a of the second surrounding portion 12 in this embodiment). In this embodiment, each of outer surfaces of the depressions C includes an outer surface 12f3 inclined from the maximum width outer surface 12f1 (hereinafter also referred to as an "inclined outer surface 12f3 of each column portion 12a of the second surrounding portion 12", in this embodiment"), and an outer surface 12f4 having the smallest width from the inner circumferential surface 10f of the surrounding portion 10 (hereinafter also referred to as a "minimum width outer surface 12f4 of each column portion 12a of the second surrounding portion 12" in this embodiment). The inclined outer surface 12f3 of each column portion 12a of the second surrounding portion 12 is connected to the maximum width outer surface 12f1 of each column portion 12a of the second surrounding portion 12, and is inclined inward in the width direction of the bracket 1 toward the first surrounding portion 11. The minimum width outer surface 12f4 of each column portion 12a of the second surrounding portion 12 is an outer surface connecting the inclined outer surface 12f3 of each column portion 12a of the second surrounding portion 12 and an outer surface 11f of each protruding portion 11p of the first surrounding portion 11.

In the bracket 2 according to this embodiment, the ribs 30 are fixed to the surrounding portion 10, similarly to the bracket 1 according to the first embodiment. Specifically, the ribs 30 are fixed to the outer surfaces of the depressions C provided in the surrounding portion 10. In this embodiment, the ribs 30 are fixed to the outer surfaces of the depressions C provided in the second surrounding portion 12. Specifically, the ribs 30 are fixed to the outer surfaces 11f of the protruding portions 11p of the first surrounding portion 11, and the minimum width outer surfaces 12f4 of the second surrounding portion 12. In this embodiment, the ribs 30 are injection-molded integrally with the surrounding portion 10 together with the reinforcing portion 20, similarly to the bracket 1 according to the first embodiment. In this case, the reinforcing portion 20 is pressed between the surrounding portion 10 and the ribs 30 in a state of being wound in the surrounding portion 10. Therefore, according to this embodiment, it is possible to suppress peeling of the reinforcing portion 20.

Figure 4:
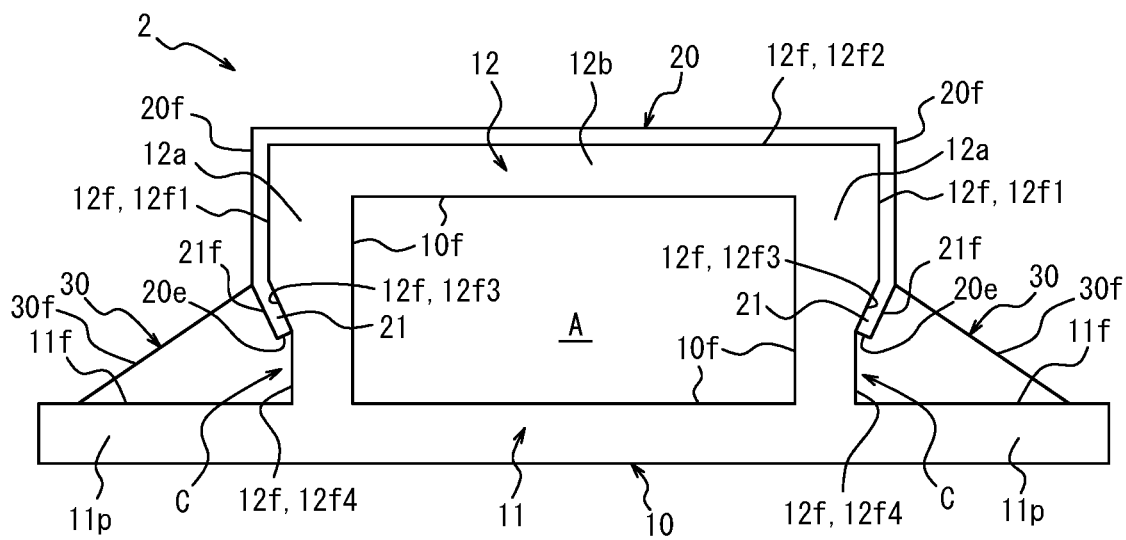
FIG. 4 is a front view of a bracket for an anti-vibration device according to a second embodiment of the present disclosure.
Figure 5:
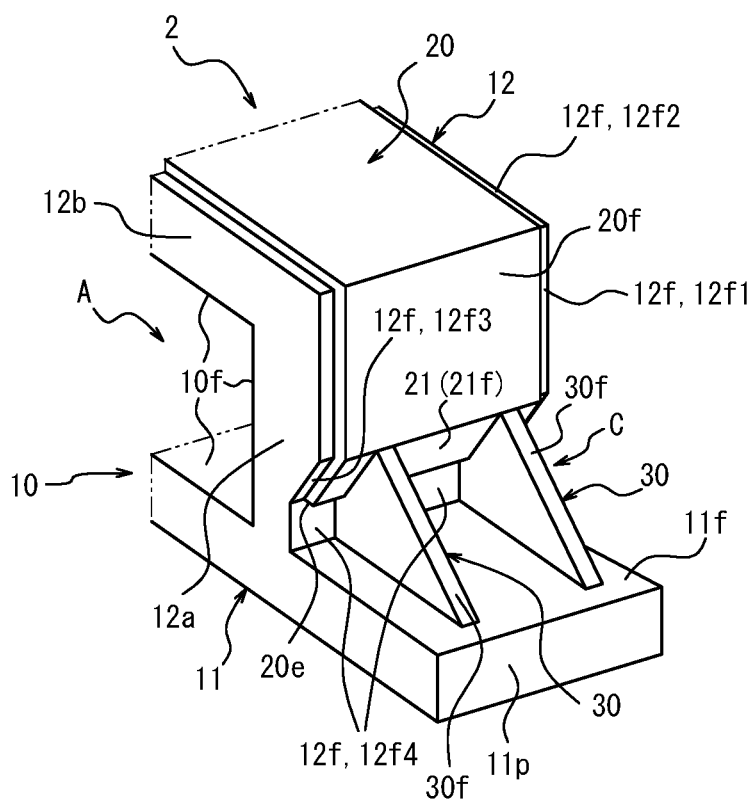
FIG. 5 is a perspective view of a principal part of the bracket for an anti-vibration device of FIG. 4.

In this embodiment, as illustrated in FIG. 4 and other drawing, outer surfaces 30f of the ribs 30 are inclined outward in the width direction of the bracket 1 with respect to an outer surface 20f of the reinforcing portion 20 toward the first surrounding portion 11. However, in this embodiment, as a modification thereof, the outer surfaces 30f of the ribs 30 can extend along the height direction of the bracket 2 at the same position in the width direction of the bracket 1 as the outer surface 20f to the reinforcing portion 20 fixed to the outer surfaces 12f1 of the column portions 12a in the outer surface 12f of the second surrounding portion 12, or a position on the inner side in the width direction of the bracket 2 with respect to the outer surface 12f of the reinforcing portion 20, for example. When the ribs 30 of such a modification are employed, no protrusion is provided around the bracket 2, and it is possible to make the bracket 2 compact.

Figure 6:
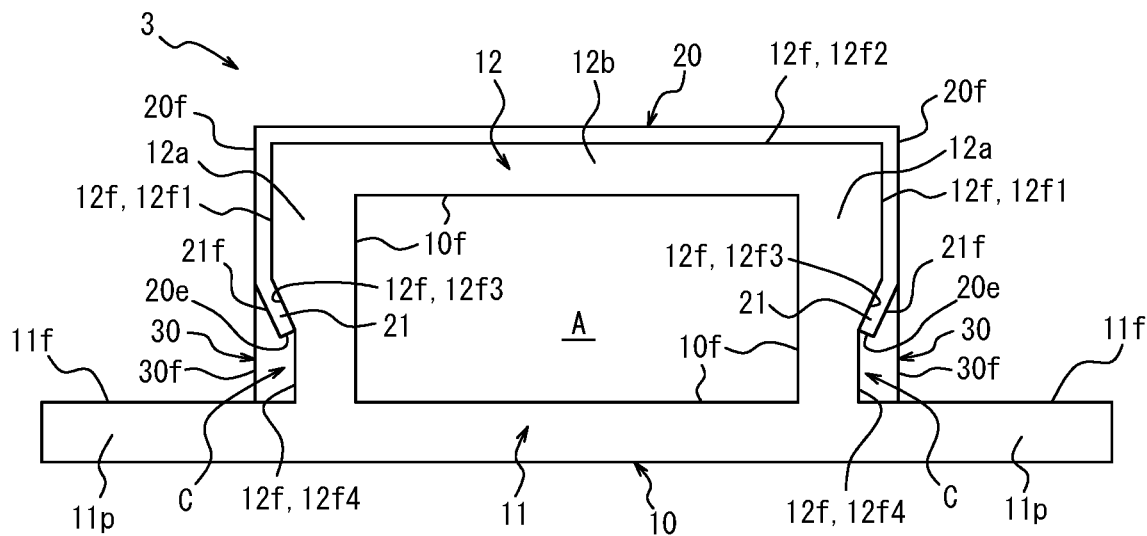
FIG. 6 is a front view of a bracket for an anti-vibration device according to a third embodiment of the present disclosure.
Figure 7:
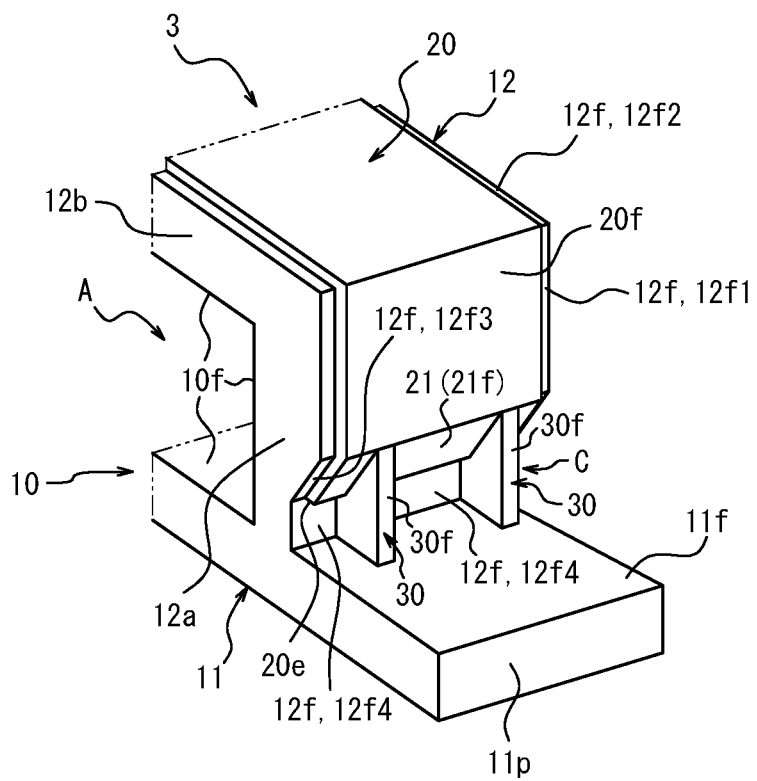
FIG. 7 is a perspective view of a principal part of the bracket for an anti-vibration device of FIG. 6.

FIG. 6 and FIG. 7 each illustrate a bracket 3 for an anti-vibration device (hereinafter also simply referred to as a "bracket 3") according to a third embodiment of the present disclosure. In the following description, substantially the same portions as the portions of the bracket according to each of the aforementioned embodiments are denoted by the same reference numeral, and description thereof will be omitted.

In the bracket 3 according to this embodiment, outer surfaces 30f of ribs 30 linearly extend along the height direction of the bracket 3 at the same position in the width direction of the bracket 3 as an outer surface 20f of a reinforcing portion 20 fixed to outer surfaces 12/1 of column portions 12a in an outer surface 12f of a second surrounding portion 12. When at least a part of each rib 30 is located at such a position as to span and cover the outer surface 20f of the reinforcing portion 20, outer surfaces 30f of ribs 30 can linearly extend along the height direction of the bracket 3 at positions on the inner side in the width direction of the bracket 3 with respect to the outer surface 20f of the reinforcing portion 20 fixed to maximum width outer surfaces 12/1 of column portions 12a of the second surrounding portion 12 with the outer surface 20f of the reinforcing portion 20, as a modification of this embodiment. Alternatively, as another modification of this embodiment, the outer surfaces 30f of the ribs 30 can be inclined toward the inner side in the width direction of the bracket 3 with respect to the outer surface 20f of the reinforcing portion 20 fixed to the maximum width outer surfaces 12/1 of the column portions 12a of the second surrounding portion 12 toward the first surrounding portion 11. Each of the aforementioned brackets 2 and 3, and the like, can be also easily obtained by a manufacturing method similar to the manufacturing method for the bracket 1 according to the first embodiment.

As described above, according to the present disclosure, it is possible to provide the brackets 1 to 3 for an anti-vibration device, and the like, in which increase of weight and peeling of the reinforcing portion 20 are suppressed.

The above merely illustrates several embodiments of the present disclosure, and various changes can be performed within the scope of the claims. For example, while the outer surface 20f of the reinforcing portion 20 protrudes outward with respect to the outer surface of the surrounding portion 10 in the bracket according to each of the aforementioned embodiments, for example, the reinforcing portion 20 can be made to coincide with the outer surface of the surrounding portion 10 by being buried in the surrounding portion 10. The form (shape) of the surrounding portion 10 is not limited to the form (shape) of each of the aforementioned embodiments. For example, the surrounding portion 10 can be locally divided in the surrounding direction thereof. Furthermore, each configuration of the brackets 1 and 2 according to the aforementioned respective embodiments can be used by being suitably replaced, or combined.

REFERENCE SIGNS LIST 1 bracket for anti-vibration device (first embodiment)
2 bracket for anti-vibration device (second embodiment)
3 bracket for anti-vibration device (third embodiment)
10 surrounding portion
10f inner circumferential surface of surrounding portion
11 first surrounding portion
11p protruding portion of first surrounding portion
11f upper surface of protruding portion of first surrounding portion
12 second surrounding portion
12a column portion of second surrounding portion
12b beam portion of second surrounding portion
12f outer surface of second surrounding portion
12/1 outer surface of column portion of second surrounding portion (maximum width outer surface of column portion of second surrounding portion)
12/2 outer surface of beam portion of second surrounding portion
12/3 inclined outer surface of column portion of second surrounding portion
12/4 minimum width outer surface of column portion of second surrounding portion
20 reinforcing portion
20e edge of reinforcing portion
20f outer surface of reinforcing portion
21 end of reinforcing portion
21f outer surface of end of reinforcing portion
30 rib
30f outer surface of rib
A through-hole
C depression

The invention claimed is:

1. A bracket for an anti-vibration device having a surrounding portion for surrounding an anti-vibration member and a mounting member configured to be mounted on one of a vibration generation side and a vibration receiving side, the bracket for an anti-vibration device configured to be mounted on another of the vibration generation side and the vibration receiving side, the bracket for an anti-vibration device comprising:
   a reinforcing portion that extends in a surrounding direction of the surrounding portion, has ends in both directions of the surrounding direction, and is fixed to a side of an outer surface of the surrounding portion; and
   a rib that is formed on the outer surface of the surrounding portion so as to span the end of the reinforcing portion in the surrounding direction of the surrounding portion, wherein
   the surrounding portion and the rib are made of synthetic resin,
   the reinforcing portion is made of fiber reinforced plastic containing synthetic resin in fibrous elements,
   the rib covers an outer surface of the end of the reinforcing portion,
   a length of the rib in a lengthwise direction is shorter than a length of the reinforcing portion in the lengthwise direction, the lengthwise direction is an extending direction of a through-hole formed inside of the surrounding portion,
   the surrounding portion has:
      a first surrounding portion that is fixed to the other of the vibration generation side and the vibration receiving side and is a planar plate-like portion: and
      a second surrounding portion that surrounds the anti-vibration member and the mounting member together with the first surrounding portion and is an arch-shaped portion connected to the first surrounding portion, and a depression is provided in an outer surface of the second surrounding portion, the end of the reinforcing portion is fixed to the depression in the outer surface of the second surrounding portion.

2. The bracket for an anti-vibration device according to claim 1, wherein the reinforcing portion is fixed to the outer surface of the second surrounding portion, and the rib is formed on the first surrounding portion and the second surrounding portion.

3. The bracket for an anti-vibration device according to claim 2, wherein the first surrounding portion has a protruding portion that protrudes outward with respect to the second surrounding portion, and the rib is formed on an outer surface of the protruding portion of the first surrounding portion, and the outer surface of the second surrounding portion.

4. The bracket for an anti-vibration device according to claim 1, wherein the bracket for an anti-vibration device has the reinforcing portion, and the surrounding portion and the rib molded integrally with the reinforcing portion.

5. The bracket for an anti-vibration device according to claim 2, wherein the bracket for an anti-vibration device has the reinforcing portion, and the surrounding portion and the rib molded integrally with the reinforcing portion.

6. The bracket for an anti-vibration device according to claim 3, wherein the bracket for an anti-vibration device has the reinforcing portion, and the surrounding portion and the rib molded integrally with the reinforcing portion.

7. A method for manufacturing a bracket for an anti-vibration device, for obtaining the bracket for an anti-vibration device according to claim 1, comprising a step of injecting synthetic resin serving as the surrounding portion and the rib into a mold cavity where a reinforcing member serving as the reinforcing portion is set.

8. A method for manufacturing a bracket for an anti-vibration device, for obtaining the bracket for an anti-vibration device according to claim 2, comprising a step of injecting synthetic resin serving as the surrounding portion and the rib into a mold cavity where a reinforcing member serving as the reinforcing portion is set.

* * * * *